United States Patent Office 3,482,547
Patented Dec. 9, 1969

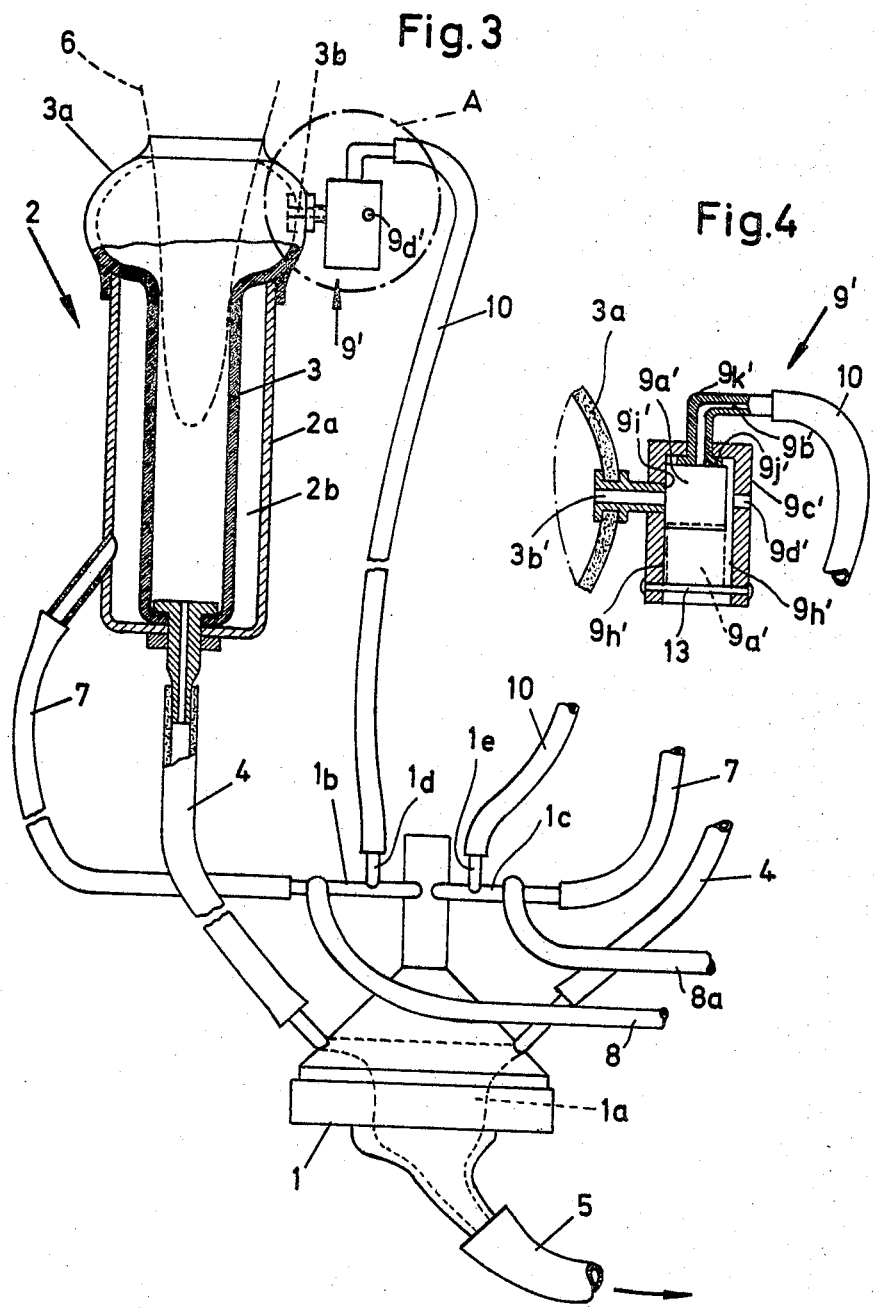

3,482,547
MILKING MACHINE
Jakob Maier, Tussenhauserstr. 30, Turkheim,
Bavaria, Germany
Filed June 5, 1967, Ser. No. 643,521
Claims priority, application Germany, June 6, 1966,
M 69,743; Jan. 30, 1967, M 72,586
Int. Cl. A01d 5/16
U.S. Cl. 119—14.36        9 Claims

ABSTRACT OF THE DISCLOSURE

A milking machine wherein a teat cup is provided with a resilient liner therein, the interior of the liner being connected to a suction source. The walls of the liner and the cup define a chamber therebetween which is connected to a distributor which in turn is connected to a pressure pulsator. The liner is also provided with an atmospheric inlet opening at the upper edge thereof, which opening is opened and closed by means of a check valve operated synchronously in rhythm with the pulsation of the pulsator. A control suction conduit interconnects the distributor and the check valve for alternately opening and closing the valve in response to the negative pressure pulses applied to the liner, the check valve being in the closed position when subjected to a negative pressure pulse.

FIELD OF THE INVENTION

This invention relates to a milking machine comprising teat cups each of which has a suction liner of resilient material penetrated by an inlet opening for permitting atmospheric air to pass therethrough. The inner wall of said cup and the outer wall of said liner defines a chamber therebetween, which chamber is connectible through a distributor to a pressure pulsator for applying an alternating pressure to the suction liner.

DESCRIPTION OF THE PRIOR ART

The agricultural machinery industry presently manufactures milking machines of the above-mentioned type having teat cups, each suction liner of which is continuously in connection with the atmospheric air through the inlet opening and is also connected to a negative pressure unit. By the effect of the pulsator, the pressure vanes between a negative pressure of almost 0.5 atmospheric and total atmospheric pressure. The outer air pressure in the chamber between the suction liner and the cup wall is changed approximately 64 times per minute, which each time interrupts the suction and thus acts in the form of a pressurized massaging effect on the teat, said effect being approximated to a sucking calf with respect to the rhythm and the pressure applied to the teat.

In spite of an exact calibration of the size of the inlet opening for providing proper atmospheric pressure balance inside the teat cup, the negative pressure is often reduced too rapidly by the atmospheric air entering said inlet opening and thus the pressure or massaging effect is impaired. This makes it necessary to remilk the animal for a longer period of time in order to achieve a complete milking. Further, this results in disturbances in the blood circulation of the teat as recognizable by discoloring of said teat.

It is the purpose of this invention to further develop a milking machine of the above-defined type based on economically possible constructive steps whereby the remilking time is reduced to a minimum and disturbances in the blood circulation of the teat are prevented. This is achieved according to the invention in a manner whereby the inlet opening for atmospheric air has arranged therein a check valve which is controllable and movable according to the operating rhythm of the pulsator, the closed position of said check valve corresponding to the negative pressure pulsation of the pulsator.

The suction liners of the teat cups in the milking machine of the present invention are hermetically closed with respect to the atmospheric air during the negative pressure pulsation of the pulsator. Thus, the negative pressure in the suction liner of the pulsator is maintained constant during application of the negative pressure pulsation to the chamber between the cup and liner, whereby the liner widens and the teat is sucked into the suction liner of the teat cup over a considerable area, said cup rising at the same time. This results in a strong massaging effect and disturbances in the blood circulation are prevented. It has been proven in practice that by using the milking machine of the present invention, the remilking which usually gives several liters per animal is reduced to approximately one-half liter per animal.

A further useful development of the invention results from the fact that the check valve is controllable by a pulsator through a control suction conduit which is connectible to the distributor. Since the pulsator is used as a control member, other control means are not required and thus the expenses for the manufacture and maintenance of the machine are considerably reduced. Further, it is also possible to rebuild presently existing milking machines of the before-mentioned type in an inexpensive and simple manner to convert them into machines according to the invention, resulting in considerably higher effectiveness.

For a structurally simple embodiment, the present invention provides that the check valve has a ball valve which is movable in the manner of a self-closing valve, the ball valve in the closed position closing not only the inlet opening but also the valve port of the control suction conduit. Such a check valve is simple in structure and therefore simple in operation. Moreover, due to the simultaneous closing of the inlet opening and the port of the control suction conduit, it is possible to connect the latter directly or indirectly to the chamber between the teat cup and its suction liner without reducing the negative pressure caused by the pulsations.

In this connection, it is advantageous if additional connecting nipples are arranged on the distributor for the control suction conduits of the respective teat cups.

In a preferred embodiment of the milking machine according to the present invention, the suction liners of the teat cups have a hollow spherical teat receiver portion on the upper end thereof, the check valve being arranged and mounted on the teat receiver portion. This arrangement makes the check valve easily accessible and thus said check valve can be easily kept clean.

It is especially advantageous if the seat for the ball valve extends at a slope with respect to a horizontal line in the check valve housing and if said housing is adjustably mounted to the teat receiver portion, thereby permitting adjustment of the seat inclination. Thus, the operating characteristics of the check valve can, in a simple manner, be adjusted to compensate for the magnitude of the negative pressure produced by the respective pulsator.

To provide low costs for manufacturing the check valve, the present invention provides a further advantageous embodiment wherein the valve member is formed as a prism which is movably guided between guiding surfaces formed on the valve housing and which, when in the closed position, rests with at least one planar surface thereof against a planar valve seat.

The check valve housing of this embodiment is inexpensive because the planar construction of the valve seat permits it to be manufactured in large numbers from inexpensive materials, such as plastics. The valve member can consist of a section of a bar, the valve member thus also being inexpensive to manufacture. The bar can, for example, have a rectangular or triangular cross section.

Furthermore, it is advantageous if one of the guiding surfaces of the valve housing forms at least one of the valve seats. This saves finishing costs for at least one of the valve seats.

BRIEF DESCRIPTION OF THE DRAWINGS

The invention is discussed more in detail in conjunction with the accompanying drawings, wherein:

FIGURE 3 is a partial schematic illustration of a modified milking machine with the teat cup shown partially in cross section and connected to the distributor.

FIGURE 4 is an enlarged central cross-sectional view of the detail B in FIGURE 3.

DETAILED DESCRIPTION

Figure 1:
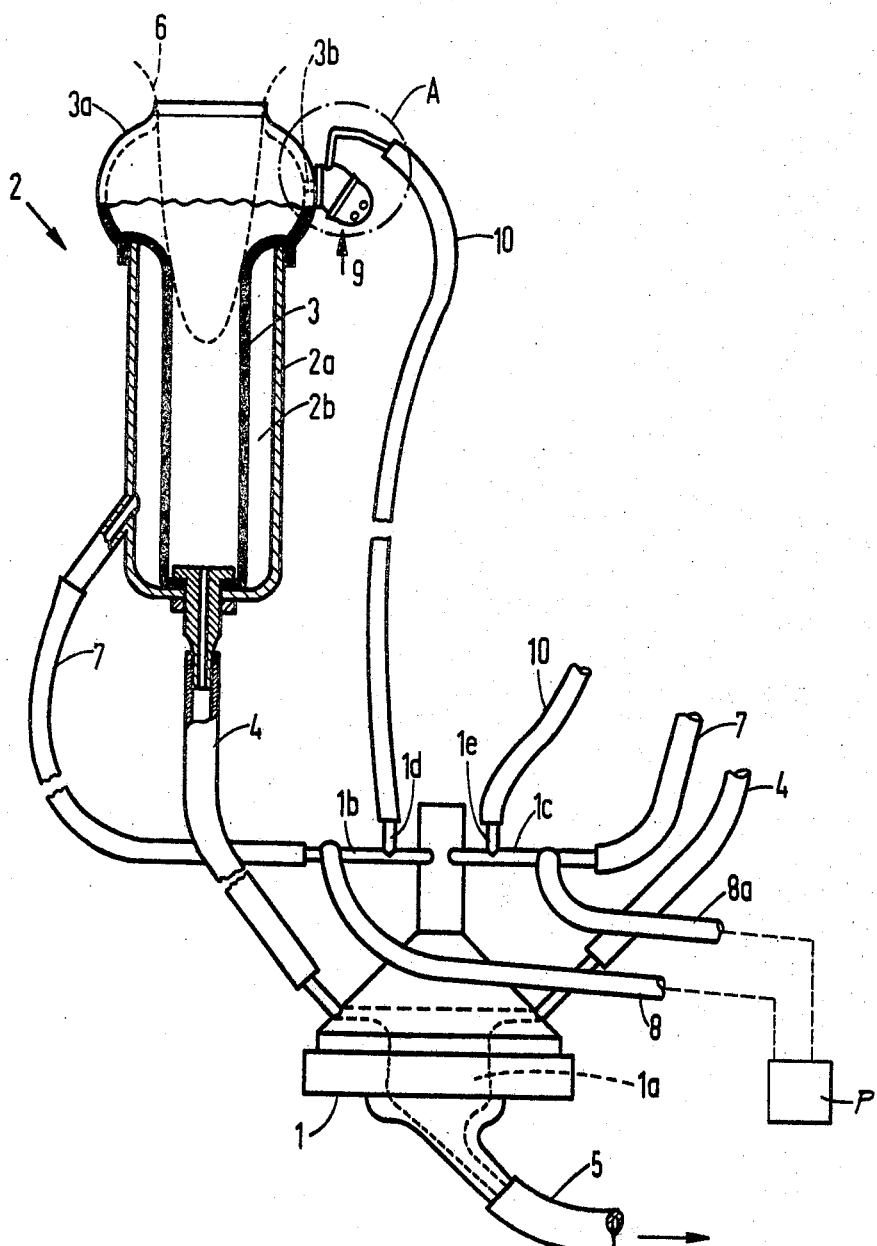
FIGURE 1 is a partial schematic illustration of a milking machine embodying the invention with the teat cup shown partially in cross section and connected to the distributor.

FIGURE 1 illustrates one of four teat cups 2 connected to a distributor 1, each of said teat cups 2 having a resiliently deformable suction liner or insert 3, the inside of which is connected through a suction conduit 4 to a receiver chamber 1a which is provided in the distributor 1 and which is connected to a suction pump (not illustrated) through a main suction conduit 5.

The suction liner 3 is manufactured in one piece having a portion 3a for receiving a teat 6 (indicated in dotted lines), said teat receiver portion 3a having a spherical shape. A chamber 2b is provided between the approximately cylindrically extending lower portion of the suction liner 3 and the outer shell 2a of the teat cup 2, said chamber 2b being connected to a pressure pulsator D through conduits 7 and 8 and an intermediate pipe 1b mounted on the distributor 1. In addition to pipe 1b, which usually has two teat cups 2 connected thereto, a further pipe 1c is mounted on the distributor 1, said latter pipe being independent from pipe 1b and being connected to the pulsator through a conduit 8a. The operating rhythm of said pulsator, which consists of alternating negative and atmospheric or positive fluid pressure pulsations, is adjusted to the natural suction movements of a calf, being approximately 64 pulsations per minute. The pipe 1c, which also has connecting conduits for two teat cups 2, is connected to the pulsator and is subjected to pressure pulses which are out of phase with respect to the pulses applied to the pipe 1b.

To achieve an atmospheric pressure balance on the suction liner 3, the wall of the liner is provided with, in the area of the teat receiver portion 3a, an inlet opening 3b for permitting atmospheric air to pass therethrough.

The inlet opening 3b has according to the invention a check valve 9 mounted therein which is controllable and movable in rhythm with the pressure pulses of the pulsator, the check valve being in the closed position when subjected to the negative pressure pulsation of said pulsator.

The preferred embodiment of the invention illustrated in the drawings uses the pulsator itself as a control member for the check valve 9, said pulsator being connected to the valve 9 by means of a control suction conduit 10 which is connected to the pipe 1b of the distributor 1, said pipe 1b also being connected to the chamber 2b of the teat cup 2 by means of conduit 7. Said distributor 1 is provided with an additional nipple 1d or 1e for each of the teat cups 2 in order to connect the corresponding control suction conduits 10 to the pulsator.

Figure 2:
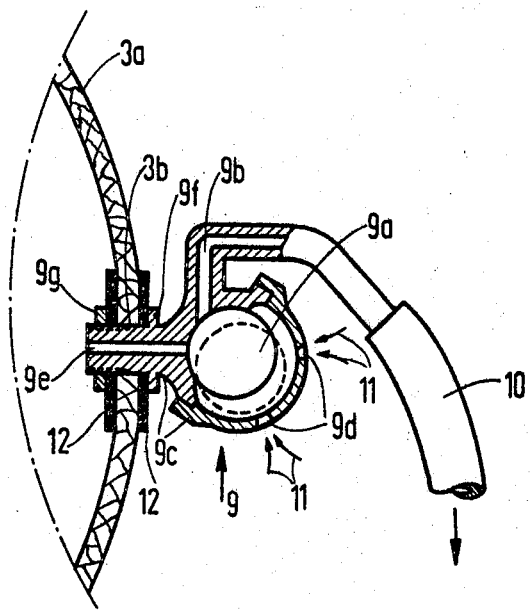
FIGURE 2 is an enlarged central cross-sectional view of the detail A in FIGURE 1.

According to FIGURE 2, the check valve 9 is provided with a ball valve member 9a which is movable as a self-closing valve, the ball valve not only closing the inlet opening 3b but also closing a channel 9b when in its closed position as illustrated by solid lines, which closed position corresponds to the negative pressure pulsation of the pulsator. The channel 9b forms a valve port for the control suction conduit 10.

The check valve 9 advantageously comprises a two-part valve housing 9c in which is formed a cup-like spherical seat for the ball valve 9a. The seat extends at a slope relative to the horizontal axis of a channel 9e. The ball member 9a is movable between the closed position and the open position indicated in dotted lines. With the valve in the open position, the atmospheric air indicated by the arrows 11 will enter the valve housing 9c through openings 9d, the air entering at a certain velocity and then passing through the valve channel 9e into the chamber of the teat receiver portion 3a or the suction liner 3, said chamber being connected to the suction pump. Said air velocity will be increased immediately upon initiation of the negative pressure pulse whereby a negative pressure is produced in the control suction conduit 10, which causes prompt movement of the valve member 9a, in the manner of a self-closing valve, from the open position illustrated in dotted lines to the closed position. Said latter position also closes the valve channel 9b so that the negative pressure in the control suction conduit 10 is maintained during the time period that the negative pressure pulse is applied.

To adjust the operating characteristics of the check valve 9 so as to make the valve usable with various magnitudes of negative pressure pulses, the valve housing 9c is horizontally mounted to the teat receiver portion 3a with the outer wall of the valve channel 9e penetrating the inlet opening 3b and being rotatable about the axis of said inlet opening. By means of a stationary flange 9f and a screwable flange 9g, the wall of receiver portion 3a is fixedly clamped to the valve housing. To prevent wear of the resilient material of the teat receiver portion 3a or the suction liner 3, shim plates 12 can be provided in the area of the flanges 9f, 9g. By the above construction, the valve characteristics can be adjusted merely by rotating the valve housing relative to the receiver portion 3a, thus adjusting the inclination of the valve seat relative to a horizontal plane.

FIGURE 3 illustrates another embodiment of the invention wherein one of four teat cups 2 is connected to a distributor 1, each of said cups having therein a resiliently deformable suction liner 3. A check valve 9' is provided on the spherical teat receiver portion 3a of suction liner 3, said check valve being controllable, for example pneumatically, through a control suction conduit 10 and movable in rhythm with the pressure pulses of a pulsator (not illustrated) connected to the milking machine. The check valve 9' makes possible the penetration of atmospheric air into the inside of suction liner 3 and thus allows a pressure balance in same during the time intervals between the negative pressure pulsations of the pulsator.

According to FIGURE 4, the check valve 9' has a valve member 9a' which is movable in a valve housing 9c' in the manner of a self-closing valve, said valve member when in the closed position (indicated in solid lines) sealing an inlet channel 3b' leading into the inside of the teat receiver portion 3a and also sealing a channel 9b' which forms the valve side port of the control suction conduit 10. In the open position of the valve member 9a' as indicated in dotted lines in FIGURE 4, atmospheric air can penetrate through at least one opening 9d' in the valve housing 9c' and then pass through the inlet channel 3b' into the teat receiver portion 3a of the suction liner.

According to the invention, the valve member 9a' is formed by a prism movably guided between the guide surface 9h' of the valve housing 9c' and resting, when in closed position, with at least one planar surface of the valve member against the planar valve seats 9i' and 9j'.

Said prism may have, in the embodiment of FIGURE 4, the shape of a bar.

At least one of the guiding surfaces of the valve housing 9c', such as the guiding surface 9h', forms the valve seat 9i' extending around the inlet channel 3b' while the valve seat 9j' is formed as an outer flange of a pipe 9k' which has a channel 9b' extending therethrough.

A negative pressure exists in the control suction conduit 10 and also inside the teat receiver portion 3a when the check valve 9' is in the closed position so that the valve member 9a' is firmly pressed against the valve seats 9i' and 9j' by the atmospheric pressure applied to said valve member. The prism 9a' can therefore be guided with a relatively large amount of clearance or play between the guiding surfaces 9h as is clearly shown in FIGURE 4.

The valve housing 9c' is advantageously manufactured of transparent plastic and is open on the side opposite the pipe 9k' so that the valve member 9a' can be inserted through the housing opening and can then be secured in the housing in a simple manner by means of a pin 13. Said pin forms, at the same time, a stop for the valve member 9a' when in its open position.

This invention is not limited to the embodiments illustrated in the drawings. For example, it is also possible to construct the prism which forms the valve member 9a', as seen in its direction of movement, with a triangular or rectangular cross section. It is also possible that the valve member 9a' be not moved in the manner of a quick-acting gate valve by means of atmospheric pressure acting thereon during the negative pressure pulsation of the pulsator.

The embodiments of the invention in which an exclusive property or privilege is claimed are defined as follows.

I claim:

1. A milking machine comprising a teat cup having a resilient liner therein, said liner having an inlet opening in the wall thereof for connecting the interior of the liner to the atmosphere, the walls of said cup and said liner defining a chamber therebetween, distributor means connected to said chamber, pressure pulsator means connected to said distributor means for subjecting said chamber to pressure pulsations, and check valve means controlling the flow of air through said inlet opening, said valve means being synchronously movable in rhythm with the pressure pulsations and being in a closed position relative to the inlet opening when said pulsator means is applying a negative pressure pulse.

2. A milking machine according to claim 1, wherein a control suction conduit connects said check valve means and said distributor means whereby said check valve means is controlled by said pulsator means.

3. A milking machine according to claim 2, wherein the check valve means has a ball valve member movable in the manner of a self-closing valve with said ball valve in the closed position closing not only the inlet opening but also the valve side port of said control suction conduit.

4. A milking machine according to claim 1, wherein the suction liner has a hollow spherical teat receiver portion with said check valve means being mounted on the teat receiver portion.

5. A milking machine according to claim 4, wherein the seat for the ball valve member within the check valve housing is sloped relative to a horizontal plane, said valve housing being adjustably mounted on the teat receiver portion to permit adjustment of the seat inclination.

6. A milking machine according to claim 1, wherein additional connecting nipples are arranged on the distributor means for the control suction conduit of each respective teat cup.

7. A milking machine according to claim 1, wherein the check valve means has a valve member formed by a prism movably guided between guiding surfaces on the valve housing and resting, when in the closed position, with at least one planar surface of the member against planar valve seats.

8. A milking machine according to claim 7, wherein one of the guiding surfaces of the valve housing forms at least one of the valve seats.

9. A milking machine according to claim 7, wherein the check valve means functions as a self-closing valve, and wherein substantial clearance exists between said valve member and said guiding surfaces formed on said valve housing.

References Cited

UNITED STATES PATENTS

| | | | |
|---|---|---|---|
| 2,531,266 | 11/1950 | Gierl | 119—14.31 |
| 2,944,514 | 7/1960 | Nesseth | 119—14.49 |
| 3,176,654 | 4/1965 | Morrison et al. | 119—14.01 |
| 3,255,732 | 6/1966 | Raht | 119—14.52 |

HUGH R. CHAMBLEE, Primary Examiner

U.S. Cl. X.R.

119—14.52